Patented Mar. 23, 1954

2,673,204

UNITED STATES PATENT OFFICE 2,673,204

PROCESSES FOR THE SYNTHESES OF LEUCOPTERIN AND THE INTERMEDIATES THEREOF AND OF 2,4,5-TRIAMINO-6-HYDROXY PYRIMIDINE SULFITE AND THE ALKALI SALTS THEREOF

Herbert Heinrich, Wauwatosa, and William F. Buth, Milwaukee, Wis., assignors to Wickhen Products, Inc., Milwaukee, Wis., a corporation of Wisconsin No Drawing. Application September 16, 1950, Serial No. 185,318

44 Claims. (Cl. 260—251.5)

This invention relates to processes for the preparation of the known 2,4-diamino-6-hydroxy pyrimidine and 2,4-diamino-5-nitroso-6-hydroxy pyrimidine, to a new 2,4,5-triamino-6-hydroxy pyrimidine sulfite and the alkali salts thereof and the process for the preparation thereof, and to processes for conversion of one of the latter new compounds to leucopterin.

The synthesis of the above amino-6-hydroxy pyrimidine compounds heretofore involved the use of metallic sodium which has to be dissolved in absolute ethanol. Both metallic sodium and absolute ethanol are expensive and the process is extremely hazardous because of the use of the metallic sodium and the liberation of hydrogen. In such processes also, the recovery of the alcohol is highly desirable to minimize costs, which makes the equipment complicated and such equipment is quickly fouled by residues in the processes.

Further, the prior processes for such syntheses involve the steps of forming the free guanidine base (by use of metallic sodium) and converting the base to cyano-guanidine acetate which was dissolved in an alkali solution and heated to form 2,4-diamino-6-hydroxy pyrimidine. Thereafter the 2,4-diamino-6-hydroxy pyrimidine is converted to the sulfate and the sulfate was treated with sodium nitrite to produce 2,4-diamino-5-nitroso-6-hydroxy pyrimidine, which was treated with ammonium sulfide or sodium hydrosulfite to produce a bi-sulfite addition of 2,4,5-triamino-6-hydroxy pyrimidine. Such product was then mixed with oxalic acid and heated under reduced pressure at temperatures up to 260° C. and for up to ninety minutes to produce leucopterin. Hence, the entire process of making leucopterin involved many steps in each of which unavoidable losses occurred. The reagents used were expensive, difficult to handle and to recover. The product obtained was not entirely satisfactory and the yields were low.

It is therefore one object of the present invention to produce the di- and triamines of 6-hydroxy pyrimidine and the 5-nitroso derivative of the diamine without the use of hazardous or expensive reagents and in simple equipment.

Another object of the invention is to provide a process reducing the number of reactions required in and otherwise simplifying the synthesis of 2,4-diamino-6-hydroxy pyrimidine.

Another object of the invention is to provide simplified and low cost processes for the preparation of 2,4-diamino-5-nitroso-6-hydroxy pyrimidine.

A further object of the invention is to produce a 2,4,5-triamino-6-hydroxy pyrimidine sulfite and the alkali salts thereof.

Another object of the invention is to provide processes permitting recovery of substantial portions of the reagents employed in the synthesis of a 2,4,5-triamino-6-hydroxy pyrimidine sulfite and its alkali salts.

And a further object of the invention is to provide processes for the synthesis of leucopterin of lighter color and in greater yield than heretofore obtained and to permit easy recovery of material quantities of the reagents employed in the processes.

Generally, the present invention provides two generally similar processes for the preparation of 2,4-diamino-6-hydroxy pyrimidine. In the one process, guanidine hydrochloride and ethyl cyanoacetate are reacted in an alkali or alkaline earth hydroxide solution in water. The mixture is first cooled until addition of the ethyl cyanoacetate is completed and is then heated to a temperature ranging from 120–160° C. to obtain a pyrimidine structure. In the other process, guanidine carbonate and cyanoacetic acid are mixed with water until no further carbon dioxide evolves. After boiling the mixture, an alkali or alkaline earth hydroxide solution is added to make the solution slightly basic and the mixture is again heated to form a pyrimidine structure.

After either of the above processes, the mixture is neutralized with an inorganic acid and treated with an alkali or alkaline earth nitrite. The desired product which is 2,4-diamino-5-nitroso-6-hydroxy pyrimidine, is then precipitated as rose-red microcrystal by slowly adding more of the same inorganic acid.

The 2,4-diamino-5-nitroso-6-hydroxy pyrimidine is readily converted into a 2,4,5-triamino-6-hydroxy pyrimidine derivative by adding an alkaline bi-sulfite. The mixture is then heated to the boiling point of water until the rose-red color of the nitroso compound disappears completely. The mixture is then cooled and either an alkali or alkaline earth metal or a "free" sulfite derivative of 2,4,5-triamino-6-hydroxy pyrimidine is obtained upon a single or repeated treatment respectively with an inorganic acid.

The present invention also presents two processes for converting the 2,4,5-triamino-6-hydroxy pyrimidine sulfite to leucopterin by fusion either in solution or in dispersion. In one process, the sulfite compound is dispersed in a melted inert solid and oxalic acid is added to the mixture after the same has reached homogeneity. The mixture is then further heated but not over the boiling point of the liquefied carrier, until production of a uniform canary yellow color. The leucopterin is then made separable from the mixture by the addition of water. In another process, the sulfite compound and oxalic acid are ground together and dispersed in a high boiling point, stable, non-foaming liquid carrier inert to the two reactants, and heated to the yellow color. The leucopterin forms an amorphous mass during the heating and is readily separated from the liquid. For purification of leucopterin made by either process the usual steps of dissolving, decolorizing and reprecipitating the leucopterin are performed.

The following examples are illustrative of our processes:

PREPARATION OF 2,4-DIAMINO-6-HYDROXY PYRIMIDINE AND OF 2,4-DIAMINO-5-NITROSO-6-HYDROXY PYRIMIDINE

Example I 60.0 g. (1.5 moles) of sodium hydroxide, or other alkali or alkaline earth hydroxide, are dissolved in a round bottomed flask in 60 ml. water to make a 50% sodium hydroxide solution and cooled to room temperature to reduce the quantity of water utilized. It will be noted that only a small quantity of water is used as maximum yields appear to be obtained by the closest approximation to anhydrous conditions permitted by the process. 143 g. (1.5 moles) of guanidine hydrochloride are pulverized and mixed, with stirring, with the sodium hydroxide solution, the sodium hydroxide serving as one of a number of convenient means for removing chlorine to obtain free guanidine. 113.0 g. (1 mole) ethyl cyanoacetate are then run slowly into the mixture with stirring. Other methods of mixing the reactants are possible such as:

Adding the free guanidine base to ethyl cyanoacetate either at room temperature or while heated to not more than 80° C., and Adding the sodium hydroxide solution to the mixture of guanidine hydrochloride and ethyl cyanoacetate.

However, neither of the above mixing steps produces the yield obtained by the mixing steps previously described.

An exothermic reaction takes place and the flask is cooled to keep the temperature below 40° C. and thereby minimize the violence of the reaction. After the reaction is completed, as indicated by failure to evolve further heat, the flask is heated slowly and uniformly while the contents thereof are stirred. The temperature is preferably kept at 120–160° C. as the yield decreases at a rapid rate at temperatures below 120° C. and above 160° C. During heating, water is driven off and ammonia evolves. After the water no longer comes off, it is desirable to cool the mixture immediately as continued heating decreases the yield. The mixture is cooled to approximately the boiling point of water (just below 100° C.) and 500 ml. water are added to precipitate 2,4-diamino-6-hydroxy pyrimidine as a white powder remaining in suspension. The structural formula is

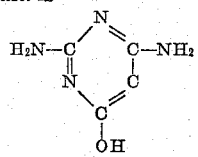

The calculated molecular weight is 126.13.

25 ml. concentrated hydrochloric acid (sp. g. 1.19) are then added to the mixture to bring the mixture to substantial neutrality. 59.5 g. (0.86 mole) of dry, granular sodium nitrite (technical grade) are added to the mixture with stirring, the quantity of sodium nitrite being sufficient to attach a nitrite group to the pyrimidine compound. An additional 60–65 ml. concentrated hydrochloric acid are then added dropwise with thorough stirring to precipitate the rose-red nitroso derivative of pyrimidine of which the structural formula is:

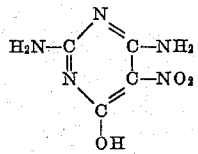

The calculated molecular weight of the nitroso derivative is 155 and the molecular weight found is 154.8. The yield obtained thus far is 65–70% of theoretical.

Example II 65.0 g. (.36 mole) (.72 equivalent) guanidine carbonate and 60.5 g. (.71 mole) (.71 equivalent) cyanoacetic acid are mixed thoroughly while dry. 75.0 ml. of water are then added slowly to the mixture. The solution is heated to boiling after the evolution of carbon dioxide ceases, for one-half hour to remove substantially all the water. 35 ml. of 2N aqueous sodium hydroxide solution (.07 mole NaOH) is then added and the solution is again heated to boiling to close the pyrimidine ring.

The reaction mixture is then allowed to cool to approximately room temperature (25° C.) and is neutralized with concentrated hydrochloric acid. 69.0 g. (1 mole) sodium nitrite is dissolved in 140 ml. of water and added to the mixture. An additional 8 ml. concentrated hydrochloric acid is then added dropwise to precipitate the rose-red nitroso derivative of pyrimidine. The yield obtained is 5.4% of theoretical. The structural formula, etc. of the derivative is as given in Example I.

In preparing the nitroso derivative, addition of hydrochloric acid in excess of that required to secure complete reaction, is to be avoided as the nitroso compound is unstable in the presence of acid and forms an undesired orange-colored product in low yields and of which the composition is now unknown. Completeness of reaction is therefore determined by filtering a portion of the final product of either of the processes for making the diamino and first adding to the filtrate a few millimeters of hydrochloric acid followed by a few granules of sodium nitrite. If no red coloration appears, the reaction is complete.

PREPARATION OF 2,4,5-TRIAMINO-6-HYDROXY PYRIMIDINE SULFITE AND THE SODIUM DERIVATIVE THEREOF 454 g. (1 lb.) of dry granulated sodium bi-sulfite is then added to the separated 2,4-diamino-5-nitroso-6-hydroxy pyrimidine (or to the final mixture of Example I or II), as an excess amount of reducing agent and the mixture is heated to 95–100° C. for three to four hours, replacing the water evaporated, until the rose-red color disappears completely and a clear light yellow solution remains. After such heating, the mixture is allowed to cool to above the solidification point of the mixture (approximately 60° C.) and is acidified with 30% sulfuric acid to approximate neutrality.

A pale yellow precipitate is obtained which decomposes on heating to 242° C. before the melting point is reached. The specific gravity is 1.793. The composition is appreciably soluble in cold water and completely soluble in hot water.

Microanalyses gave the following results:

| | | |
|---|---|---|
| C | 17.64 | 17.66 |
| H | 3.56 | 3.51 |
| N | 24.52 | 24.65 |
| S | 12.06 | 11.88 |
| Na | 9.41 | 9.69 |
| O | 32.81 | 32.61 | from which the empirical formula $C_4H_7ON_5H_3SO_5Na$ is derived. The calculated molecular weight is 279 and the following molecular weights were found by potentiometric titration: 289, 291, 292, 293, 294 dependent on the point of the titration curve chosen as the end point. By oxidation methods the molecular weights found were 274, 273.6. The yield is 70–75% of amount of nitroso used.

Upon treatment of the above compound with excess concentrated sulfuric acid, a pure white precipitate is obtained with rod-like particle shapes of which the rods were generally of the order of 14x2 microns in size. The present compound is insoluble in all of the usual solvents except concentrated sulfuric acid and strong (30% or stronger) alkali or alkaline earth hydroxide solutions. Upon recrystallization, by dilution, from the concentrated sulfuric acid, the material is recovered unchanged except that it is now in more nearly uniform rod-like form. The compound is decomposed at 246° C. before melting. The specific gravity is 1.979.

Microanalyses gave the following results:

| | | |
|---|---|---|
| C | 21.77 | 21.76 |
| H | 3.21 | 3.39 |
| N | 30.93 | 30.74 |
| S | 14.91 | 15.06 |
| O | 29.18 | 29.05 | from which the empirical formula of $C_4H_7ON_5SO_3$ is derived, of which the calculated molecular weight is 221. From precipitation samples, the following molecular weights are found: 210, 212, 216, 217, 219 and from oxidation of the sodium compound, the molecular weights of 218.4, 220, 216.4 were found. The yield is 100% of the sodium compound used.

Both of the above compounds have proven completely stable in storage for extended lengths of time which is not true of the known pyrimidine compounds. There is no change in color, no odor and no other evidences of decomposition. Upon extended heating, the sulfite compound leaves no ash.

PREPARATION OF LEUCOPTERIN

*Example A (suspended in fused carrier)*

40.0 g. (0.18 mole) of the 2,4,5-triamino-6-hydroxy pyrimidine sulfite and 200.0 g. (sufficient to obtain a mobile mixture) of acetamide are placed in a round-bottomed flask with a stirrer and a thermometer and an air-reflux condenser is placed on the flask. The mixture is heated to melt the acetamide (80° C.) and 40.0 g. (0.32 mole) of oxalic acid is then dissolved in the molten acetamide with stirring and after the mixture reaches 100° C. The temperature of the mixture is now slowly and uniformly raised to 200° C. or until a canary yellow color appears, whereupon the heating is stopped and the mixture allowed to cool to approximately 100° C. The reaction proceeds at temperatures ranging from 100–220° C. but the largest, whitest yields of leucopterin are obtained at 200° C. At temperatures lower than 200° C., the reaction apparently is not completed and at higher temperatures the product has a darker color than desired. Sufficient (200 ml.) water is then added to disperse the leucopterin as a dark tan-colored powder, to dissolve water soluble reactants and acetamide and to produce a mobile mixture at room temperature.

The yield of leucopterin based on the 2,4,5-triamino-6-hydroxy pyrimidine sulfite actually used was 78%. The calculated molecular weight based on the formula $C_6H_5O_3N_5$ is 195 and the molecular weight found was 194.8, for the monomer form which has the structural formula

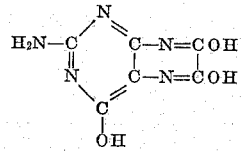

Leucopterin however actually appears to be a trimeric form of a purine $(C_6H_5O_3N_5)_3$.

The filtrate from the leucopterin preparation of Example A contains some of the unreacted 2, 4, 5-triamino-6-hydroxy pyrimidine sulfite and substantially all of the acetamide used. Allowing the filtrate to stand for twelve to twenty-four hours crystallizes an oxidizable compound from solution and it may then be recovered. The filtrate may be evaporated at 120° C. with stirring to recover the acetamide, minus 15–20% loss during evaporation.

*Example B (suspended in liquid carrier)*

250.0 g. of mineral oil is placed in a flask with a stirrer and thermometer, the oil preferably being stable, having a boiling point above 250° C., and being of the type used in pharmaceuticals and with a low surface tension to minimize frothing. 61.0 g. (0.227 mole) 2,4,5-triamino-6-hydroxy pyrimidine sulfite and 70.0 g. (0.454 mole) oxalic acid are well ground together and added to the oil. The flask is slowly and uniformly heated to 100–200° C., but not over 220° C. and then allowed to cool. During cooling the leucopterin forms as a brittle mass which is mechanically broken by stirring. Upon reaching room temperature, the mixture is filtered and the leucopterin fragments are washed with benzene. The crude brownish-tan leucopterin is purified as above described. The yield of leucopterin was 46.8% of the pyrimidine sulfite actually used.

It will be noted that a number of inert materials other than oil may be used as the dispersant, provided only that the dispersant be inert to the reactants, liquid at room temperature, stable and non-volatile to at least 250° C. and non-foaming. Dibutylphthalate and diphenyloxide and other organic solvents are satisfactory. Mineral oil recovery from the above process approximated 95%.

Fusion in a solvent carrier yields a whiter product than fusion in a liquid inert carrier.

For purification, the leucopterin is dissolved in 250 ml. 2N sodium hydroxide and is de-colorized with activated carbon. The carbon is filtered out and the leucopterin is again precipitated by adding 400 ml. of boiling 2N hydrochloric acid and is a light tan color.

The 2,4,5-triamino-6-hydroxy pyrimidine sulfite is thermally stable at the temperatures employed in the leucopterin processes and may carry unchanged through purification of the leucopterin. If such condition appears to exist, excess concentrated sulfuric acid is added to the dry mixture and then diluted. Leucopterin at once precipitates and the 2,4,5-triamino-6-hydroxy pyrimidine sulfite remains in solution.

The average particle size of the leucopterin is below 0.5 micron and the particles have Brownian movement when in suspension. The density is 1.875 and was obtained by suspending the leucopterin in ethylene tetrabromide and xylene of the same density. The leucopterin is only slightly soluble in water, the solubility being $2 \times 10^{-4}$ g. per 100 g. of water (0.0002%). The leucopterin is not soluble in organic solvents such as amides, amines, esters, halides, ketones or heterocyclic bases such as pyridine.

It will be seen that the present processes do not require either absolute alcohol or metallic sodium but are entirely carried out in aqueous solution rather than anhydrously, as heretofore. The processes are simplified by elimination of several steps previously considered necessary. Sodium and ammonium ions are removed with an inorganic acid rather than oxalic acid thus reducing the quantity (and hence cost) of oxalic acid used to one-third that used formerly. The final condensation to leucopterin takes place in solution or suspension and at lower temperatures than were heretofore believed possible.

Modifications may be made in the present invention without departing from the spirit thereof or from the scope of the appended claims.

We claim:

1. In a process for preparing 2,4-diamino-6-hydroxy pyrimidine, mixing a compound of the group consisting of the acid salts of guanidine for producing guanidine as the free base with a compound of the group consisting of cyanoacetic esters and cyanoacetic acid and in substantially equal molar ratio, adding a hydroxide of the group consisting of water soluble alkalis and alkaline earths to the mixture in an amount substantially equivalent to that of the guanidine compound used, and heating the mixture at temperatures up to 160° C. until no substantial amount of water vapor evolves for condensing the guanidine and the cyanoacetic acid to the pyrimidine.

2. In a process for preparing 2,4-diamino-6-hydroxy pyrimidine, mixing a compound of the group consisting of the acid salts of guanidine for producing guanidine as the free base with a compound of the group consisting of cyanoacetic esters and cyanoacetic acid and in a molar ratio of substantially 1.5 to 1 respectively, adding sodium hydroxide in aqueous solution to the mixture in an amount substantially equivalent to that of the guanidine produced, the amount of water used being sufficient for stirring of the mixture, and heating the mixture at a temperature and for a time sufficient for driving off the water of solution without decomposing the reactants and for closing the pyrimidine ring.

3. In a process for preparing 2,4-diamino-6-hydroxy pyrimidine, mixing a compound of the group consisting of the acid salts of guanidine for producing guanidine as the free base with a compound of the group consisting of cyanoacetic esters and cyanoacetic acid and in a molar ratio of substantially 1.5 to 1 respectively, adding a water solution of sodium hydroxide in an amount sufficient to convert the guanidine compound to free guanidine, the water being present only in an amount capable of evaporation from the mixture and the sodium hydroxide being present in an amount substantially equivalent to that of the guanidine compound used, and heating the mixture slowly to 120-160° C. and with stirring for a sufficient time to drive off substantially all the water of solution without decomposing the reactants and the pyrimidine compound formed.

4. In a process for preparing 2,4-diamino-6-hydroxy pyrimidine, the steps of mixing guanidine hydrochloride with an alkali in up to 50% water solution and in substantially equimolar quantities to obtain free guanidine, adding ethyl cyanoacetate to the mixture in molar quantity less than the quantity of guanidine hydrochloride, and heating the mixture at a temperature and for a time sufficient to drive off substantially all of the water of solution without decomposing the reactants and the pyrimidine formed.

5. In a process for preparing 2,4-diamino-6-hydroxy pyrimidine, the steps of mixing guanidine hydrochloride with sodium hydroxide in up to 50% water solution and in quantities substantially equivalent to the guanidine hydrochloride, adding ethyl cyanoacetate to the mixture in molar quantity less than the quantity of guanidine hydrochloride, and heating the mixture to boiling for a time sufficient to drive off substantially all of the water of solution without decomposing the reactants and the pyrimidine formed.

6. In a process for preparing 2,4-diamino-6-hydroxy pyrimidine, the steps of dissolving sodium hydroxide in water in up to 50% concentration, pulverizing guanidine hydrochloride, mixing the sodium hydroxide solution and the guanidine hydrochloride in substantially equimolar quantities, adding ethyl cyanoacetate to the mixture and in molar quantity less than that of the guanidine hydrochloride, and heating the mixture to 120-160° C. for a time sufficient to drive off substantially all of the water of solution without decomposing the reactants and the pyrimidine formed.

7. In a process for preparing 2,4-diamino-6-hydroxy pyrimidine, the steps of mixing guanidine hydrochloride with an alkali in up to 50% water solution and in equimolar quantities, adding ethyl cyanoacetate to the mixture slowly and with agitation in molar quantity less than the quantity of guanidine hydrochloride, and heating the mixture slowly and with agitation to boiling for a time sufficient to drive off substantially all of the water of solution without decomposing the reactants and the pyrimidine formed.

8. In a process for preparing 2,4-diamino-6-hydroxy pyrimidine, the steps of mixing guanidine hydrochloride with sodium hydroxide in water solution in up to 50% concentration and in equimolar quantities, adding ethyl cyanoacetate to the mixture in molar quantity less than the quantity of the guanidine hydrochloride, heating the mixture slowly and with agitation to boiling for a time sufficient to drive off substantially all of the water of solution without decomposing the reactants and the pyrimidine formed, and precipitating the desired product with water.

9. In a process for preparing 2,4-diamino-6-hydroxy pyrimidine, the steps of dissolving sodium hydroxide in water, cooling the solution to room temperature, pulverizing dry guanidine hydrochloride, mixing the guanidine hydrochloride with the sodium hydroxide solution in equimolar quantities, adding ethylcyanoacetate to the mixture in molar quantity less than that of the guanidine hydrochloride, cooling the mixture to approximately 40° C. until heat no longer evolves, heating the mixture to not over 160° C. for a sufficient length of time to close the pyrimidine ring, cooling the mixture after substantially no more water is evaporated, and precipitating the desired product with water.

10. In a process for preparing 2,4-diamino-6-hydroxy pyrimidine, the steps of mixing guanidine carbonate with cyanoacetic acid in substantially equivalent amounts, adding to the mixture an alkali in molar quantity approximating one-tenth that of the acid and in up to 50% water solution, and heating the mixture at a temperature and for a sufficient time to drive off substantially all of the water of solution without decomposing the reactants and the pyrimidine compound formed.

11. In a process according to claim 10, the steps of mixing guanidine carbonate with cyanoacetic acid in molar proportions of substantially 1:2, adding to the mixture sodium hydroxide in up to 50% concentration in water and in approximately one-tenth the molar quantity of the guanidine carbonate, and heating the mixture at a temperature to drive off the water of solution while avoiding decomposition of reactants and the pyrimidine and until substantially no more water vapor evolves.

12. In a process according to claim 10, the steps of mixing a molar quantity of guanidine carbonate with two molar quantities of cyanoacetic acid, adding water slowly to the mixture until the evolution of carbon dioxide ceases, heating the mixture to boiling to drive off the major portion of the added water without decomposing the reactants, adding sodium hydroxide in up to 50% water solution and in sufficient quantity to remove the acid radical from the guanidine compound formed, and heating the mixture at 120–160° C. to drive off the water of solution without decomposing the reactants and the pyrimidine and until substantially no more water vapor evolves.

13. In a process according to claim 10, the steps of mixing guanidine carbonate with cyanoacetic acid in the respective amounts of substantially 1:2 moles, adding water slowly to the mixture until the evolution of carbon dioxide ceases, heating the mixture to boiling to drive off substantially all of the added water without decomposing the reactants, adding sodium hydroxide to the mixture in up to 50% water solution and in molar quantity approximately one-tenth that of the acid, and heating the mixture to boiling until substantially all the water is vaporized therefrom and for closing the pyrimidine ring.

14. In a process for preparation of 2,4-diamino-5-nitroso-6-hydroxy pyrimidine, the process of claim 4 with the additional steps of neutralizing the mixture with a concentrated inorganic acid, adding sodium nitrite to the mixture in sufficient quantity to attach a nitrite group to the pyrimidine ring, and adding a concentrated inorganic acid to the mixture to precipitate the nitroso compound.

15. In a process for preparation of 2,4-diamino-5-nitroso-6-hydroxy pyrimidine, the process of claim 4 with the additional steps of neutralizing the mixture with a concentrated inorganic acid, adding dry sodium nitrite to the mixture in sufficient quantity to attach a nitrite group to the pyrimidine ring, and adding the same inorganic acid as previously used to the mixture to precipitate the desired product.

16. In a process for preparation of 2,4-diamino-5-nitroso-6-hydroxy pyrimidine, the process of claim 4 and the steps of neutralizing the mixture with a concentrated hydrochloric acid, adding dry sodium nitrite to the mixture in sufficient quantity to attach a nitrite group to the pyrimidine compound, adding concentrated hydrochloric acid dropwise until all of the desired nitroso compound is precipitated.

17. In a process for the preparation of 2,4-diamino-5-nitroso-6-hydroxy pyrimidine, the process of claim 10 and the steps of neutralizing the mixture with an inorganic acid, adding sodium nitrite in sufficient quantity to attach a nitrite radical to the pyrimidine ring, and adding sufficient organic acid to precipitate the nitroso compound.

18. In a process for the preparation of 2,4-diamino-5-nitroso-6-hydroxy pyrimidine, the process of claim 10 and the steps of neutralizing the mixture with a concentrated inorganic acid, adding sodium nitrite in water solution and in sufficient quantity to attach a nitrite radical to the pyrimidine ring, and adding sufficient of the same concentrated inorganic acid as previously used to precipitate the nitroso compound.

19. In a process for the preparation of 2,4-diamino-5-nitroso-6-hydroxy pyrimidine, the process of claim 10 and the steps of neutralizing the mixture with concentrated hydrochloric acid, adding sodium nitrite in water solution and in sufficient quantity to attach a nitrite radical to the pyrimidine ring, adding concentrated hydrochloric acid dropwise until all of the nitroso compound precipitates.

20. In a process for preparing an alkaline derivative of 2,4,5-triamino-6-hydroxy pyrimidine sulfite, the steps of mixing 2,4-diamino-5-nitroso-6-hydroxy pyrimidine with a bi-sulfite of the group consisting of an alkali and an alkaline earth bisulfite in excess of the quantity required to remove the red color from the mixture, heating the mixture to approximately 100° C. until the red color disappears, and cooling the mixture to crystallize the desired compound.

21. In a process for preparing the sodium derivative of 2,4,5-triamino-6-hydroxy pyrimidine sulfite, the steps of mixing 2,4-diamino-5-nitroso-6-hydroxy pyrimidine with sodium bi-sulfite in quantity in excess of that required to remove the red color from the mixture, heating the mixture to approximately 100° C. until the red color disappears, and cooling the mixture to crystallize the desired product.

22. In a process for preparing the sodium derivative of 2,4,5-triamino-6-hydroxy pyrimidine sulfite, the steps of mixing the nitroso with sodium bi-sulfite in excess of the quantity required to remove the red color from the mixture, heating the mixture to approximately 100° C. until the red color disappears, replacing the water evaporated during heating, and cooling the mixture below 60° C. for crystallization of the desired compound.

23. In a process for preparing the sodium derivative of 2,4,5-triamino-6-hydroxy pyrimidine sulfite, the steps of mixing 2,4-diamino-5-nitroso-6-hydroxy pyrimidine with dry sodium bi-sulfite in a quantity in excess of that required to remove the red color, heating the mixture to approximately 100° C. until the red color disappears, and cooling the mixture below the crystallization point of the compound.

24. In a process for preparing the sodium derivative of 2,4,5-triamino-6-hydroxy pyrimidine sulfite, the steps of mixing 2,4-diamino-5-nitroso-6-hydroxy pyrimidine with dry sodium bi-sulfite in a quantity greater than that required to remove the red color from the mixture, heating the mixture to approximately 100° C. until the red color disappears, replacing the water evaporated during heating, and cooling the mixture to approximately 60° C.

25. In a process for preparing a 2,4,5-triamino-6-hydroxy pyrimidine sulfite, the steps of mixing 2,4-diamino-5-nitroso-6-hydroxy pyrimidine with a bi-sulfite of the group consisting of an alkali and an alkaline earth bisulfite in a quantity greater than that required to remove the red color from the mixture, heating the mixture to approximately 100° C. until the red color disappears, cooling the mixture to above the crystallization point of the inorganic compounds therein, and adding a dilute acid to the mixture to neutralize the same and to precipitate the desired compound.

26. In a process for preparing a 2,4,5-triamino-6-hydroxy pyrimidine sulfite, the steps of mixing 2,4-diamino-5-nitroso-6-hydroxy pyrimidine with sodium bi-sulfite in a quantity greater than that required to remove the red color from the mixture, heating the mixture to approximately 100° C. until the red color disappears, cooling the mixture to above the crystallization point of the inorganic compounds therein, and adding a dilute inorganic acid to the mixture to neutralize the same and to precipitate the desired compound.

27. In a process for preparing 2,4,5-triamino-6-hydroxy pyrimidine sulfite, the steps of mixing 2,4-diamino-5-nitroso-6-hydroxy pyrimidine with sodium bi-sulfite in water solution and in a quantity greater than that required to remove the red color from the mixture, heating the mixture to approximately 100° C. until the red color disappears, cooling the mixture to approximately 60° C. and adding dilute sulfuric acid in sufficient quantity to neutralize the mixture.

28. The amino-hydroxy pyrimidine compounds made from 2,4-diamino-5-nitroso-6-hydroxy pyrimidine by the steps of mixing the nitroso with a bi-sulfite of the group consisting of an alkali and an alkaline earth bisulfite in excess of that required to remove the red color of the nitroso, heating the mixture to approximately 100° C. until the red color disappears, adding a non-oxidizing inorganic acid to the mixture, and adding more of the said inorganic acid in concentrated form to the mixture, the compounds being stable in storage for extended times.

29. The amino-hydroxy pyrimidine sulfite and its alkaline metal derivatives made from 2,4-diamino-5-nitroso-6-hydroxy pyrimidine by the steps of mixing the nitroso with a bi-sulfite of the group consisting of an alkali and an alkaline earth bisulfite in quantity in excess of that required to remove the red color of the nitroso compound, heating the mixture to approximately 100° C. until the red color disappears, adding dilute sulfuric acid to the mixture to obtain the alkaline metal pyrimidine derivative, and adding concentrated sulfuric acid to the mixture to obtain the free pyrimidine derivative.

30. The amino-hydroxy pyrimidine sulfite alkaline metal derivative made from 2,4-diamino-5-nitroso-6-hydroxy pyrimidine by the steps of mixing the nitroso with a bi-sulfite of the group consisting of an alkali and an alkaline earth bi-sulfite in excess of that required to remove the red color of the nitroso, heating the mixture to approximately 100° C. until the red color disappears, and allowing the mixture to stand until crystallization of the product therein, the compound being stable in storage for extended times.

31. The amino-hydroxy pyrimidine sulfite made from 2,4-diamino-5-nitroso-6-hydroxy pyrimidine by the steps of mixing the nitroso with a bi-sulfite of the group consisting of an alkali and an alkaline earth bisulfite in excess of that required to remove the red color of the nitroso, heating the mixture to approximately 100° C. until the red color disappears, adding a dilute non-oxidizing inorganic acid to the mixture, the compound being stable in storage for extended times.

32. The metal derivative of 2,4,5-triamino-6-hydroxy pyrimidine sulfite having the empirical formula $C_4H_{10}N_5SO_6X$ in which X is a metal of the group consisting of calcium, barium, strontium, sodium and potassium.

33. The sodium derivative of 2,4,5-triamino-6-hydroxy pyrimidine sulfite having the empirical formula $C_4H_{10}N_5SO_6Na$, the compound being pale yellow in color, decomposing at 242° C., having a specific gravity of 1.798 and being soluble in water.

34. The sulfite of 2,4,5-triamino-6-hydroxy pyrimidine having the empirical formula $C_4H_7N_5SO_4$, the compound being white in color and of rod-like crystalline form, the compound decomposing at 246° C. and having a specific gravity of 1.979, the compound being soluble in the group including sulfuric acid and alkaline solutions above 30% in concentration.

35. In a process for the preparation of leucopterin, mixing 2,4-5-triamino-6-hydroxy pyrimidine sulfite and oxalic acid in a fluid carrier, the oxalic acid being in two times the molar quantity of the sulfite, heating the mixture to not over 220° C. until a canary yellow color appears, and separating the leucopterin from the carrier.

36. In a process for the preparation of leucopterin, mixing 2,4-5-triamino-6-hydroxy pyrimidine sulfite in a liquefied solid inert thereto and as a carrier therefor, the carrier being in sufficient quantity to make a mobile mixture, adding oxalic acid to the mixture in two times the molar quantity of the sulfite, and heating the mixture to not over 220° C. until a canary yellow color appears.

37. In a process for preparation of leucopterin, mixing 2,4,5-triamino-6-hydroxy pyrimidine sulfite with melted acetamide in sufficient quantity to make a mobile mixture, adding oxalic acid to the mixture in two times the molar quantity of the sulfite, heating the mixture to not over 220° C. until a yellow color appears, and adding water in sufficient quantity to disperse the leucopterin in the fused mixture.

38. In a process for preparation of leucopterin, mixing 2,4,5-triamino-6-hydroxy pyrimidine sulfite with a liquefied solid in sufficient quantity to make a mobile carrier for the sulfite, heating the mixture with stirring to approximately 100° C., adding oxalic acid to the mixture in two times the molar quantity of the salt and after the mixture has reached 100° C., heating the mixture to not over 220° C. until a yellow color appears, and adding water in sufficient quantity to disperse the leucopterin in the carrier.

39. In a process for preparation of leucopterin, mixing 2,4,5-triamino-6-hydroxy pyrimidine sulfite with melted acetamide in sufficient quantity to make a mobile liquid as a carrier, heating the mixture to approximately 100 C., adding oxalic acid to the mixture in two times the molar quantity of the sulfite, heating the mixture slowly and uniformly to not over 220° C. until a yellow color appears, cooling the mixture to approximately 100° C., and adding water in sufficient quantity to disperse the leucopterin in the carrier.

40. In a process for preparation of leucopterin, dispersing 2,4,5-triamino-6-hydroxy pyrimidine sulfite and oxalic acid in a liquid inert thereto and in the proportion of two moles of oxalic acid per mole of the sulfite, heating the suspension to not over 220 C. until a yellow color appears, and cooling the suspension below 100° C.

41. In a process for preparation of leucopterin, dispersing 2,4,5-triamino-6-hydroxy pyrimidine sulfite and oxalic acid in a liquid inert thereto and in the proportion of two moles of oxalic acid per mole of the sulfite, the liquid being stable and having a boiling point above 220° C. and in sufficient quantity to suspend both the sulfite and the acid, heating the suspension to not over 220° C. until a yellow color appears, and cooling the suspension below 100° C.

42. In a process for preparation of leucopterin, dispersing 2,4,5-triamino-6-hydroxy pyrimidine sulfite and oxalic acid in the proportions of two moles of oxalic acid per mole of salt in one of the group consisting of acetamide, mineral oil, dibutyl phthalate and diphenyl oxide, the liquid being in sufficient quantity to suspend both the salt and the acid, heating the suspension to not over 220° C. until a yellow color appears, and cooling the suspension below 100° C.

43. In a process for preparation of leucopterin, dispersing 2,4,5-triamino-6-hydroxy pyrimidine sulfite and oxalic acid in a liquid inert thereto and in the proportions of two moles of oxalic acid per two moles of sulfite, heating the suspension to not over 220° C. slowly and uniformly and until a canary yellow color appears, and cooling the suspension below 100° C. with agitation.

44. In a process for preparation of leucopterin, grinding together 2,4,5-triamino-6-hydroxy pyrimidine sulfite and oxalic acid in the proportions of one mole of the sulfite to two moles of oxalic acid, suspending the mixture in a liquid of the group consisting of mineral oil having a boiling point up to 250° C. and dibutyl phthalate and diphenyl oxide, heating the suspension slowly and uniformly to not over 220° C. until a yellow color appears, and cooling the suspension below 100° C. and with agitation.

HERBERT HEINRICH.
WILLIAM F. BUTH.

References Cited in the file of this patent

UNITED STATES PATENTS

| Number | Name | Date |
|---|---|---|
| 2,345,215 | Purrmann | Mar. 28, 1944 |

OTHER REFERENCES

Johnson et al., Chem. Rev. 13, 260, 261 (1933).

Werner et al., Ind. Eng. Chem. 40, 1574, 1579, 1580 (1948).

MacArdle, Solvents in Synthetic Organic Chemistry, pp. 3 and 8 (1925 edition), D. Van Nostrand Co., New York, N. Y.